(12) United States Patent
Lorenzino

(10) Patent No.: US 12,226,812 B2
(45) Date of Patent: Feb. 18, 2025

(54) SHEET METAL PLATE WITH RAISED AREAS FOR CREATING INDUSTRIAL FLOORING WITH IMPROVED ADHESIVE PROPERTIES

(71) Applicant: CONSTELLIUM ISSOIRE, Issoire (FR)

(72) Inventor: Pablo Lorenzino, Saint Cassien (FR)

(73) Assignee: CONSTELLIUM ISSOIRE, Issoire (FR)

( * ) Notice: Subject to any disclaimer, the term of this patent is extended or adjusted under 35 U.S.C. 154(b) by 8 days.

(21) Appl. No.: 18/247,884

(22) PCT Filed: Oct. 4, 2021

(86) PCT No.: PCT/FR2021/051712
§ 371 (c)(1),
(2) Date: Apr. 5, 2023

(87) PCT Pub. No.: WO2022/074320
PCT Pub. Date: Apr. 14, 2022

(65) Prior Publication Data
US 2023/0415210 A1    Dec. 28, 2023

(30) Foreign Application Priority Data
Oct. 9, 2020   (FR) ...................................... 2010325

(51) Int. Cl.
*B21B 1/22*       (2006.01)
*B21B 3/00*       (2006.01)
(52) U.S. Cl.
CPC ........ *B21B 1/227* (2013.01); *B21B 2001/225* (2013.01); *B21B 2003/001* (2013.01);
(Continued)

(58) Field of Classification Search
None
See application file for complete search history.

(56) References Cited

U.S. PATENT DOCUMENTS

| 1,856,898 A | 5/1932 | Wood |
| 2017/0106418 A1* | 4/2017 | Bassi ..................... B21H 8/005 |

FOREIGN PATENT DOCUMENTS

| CN | 201933751 U | 8/2011 |
| EP | 2316590 A1 | 5/2011 |

(Continued)

OTHER PUBLICATIONS

International Search Report issued in International Application No. PCT/FR2021/051712—4 pages (Jan. 21, 2022).

*Primary Examiner* — Daniel J. Schleis
(74) *Attorney, Agent, or Firm* — McBee Moore & Vanik IP, LLC

(57) ABSTRACT

The invention relates to a sheet metal plate (10) for creating flooring (30), in particular for industrial vehicles, having on its upper surface (11) a plurality or raised patterns, each raised pattern comprising one or more protruding portions (20), the raised patterns being arranged periodically, discreetly and in orderly fashion, the height h of the raised patterns being between 0.3 and 3 mm, characterized in that the plate has, on its lower surface (12), which is intended to be bonded to a support member, a rough surface the roughness Rmax of which is between 10 μm and 250 μm. The invention also relates to the method of producing said plate and the use of said sheet metal plate for creating flooring for industrial vehicles, preferably flooring for refrigerated vehicles.

15 Claims, 6 Drawing Sheets

(52) U.S. Cl.
CPC ....... *B21B 2205/00* (2013.01); *B21B 2261/14* (2013.01); *B21B 2267/10* (2013.01)

(56) References Cited

FOREIGN PATENT DOCUMENTS

| | | |
|---|---|---|
| FR | 2747948 A1 | 10/1997 |
| JP | S59202103 A | 11/1984 |
| JP | H03114601 A | 5/1991 |
| JP | 2011069060 A | 4/2011 |
| KR | 102147477 B1 | 8/2020 |
| WO | 03013752 A1 | 2/2003 |
| WO | 2011121191 A2 | 10/2011 |

* cited by examiner

[Fig. 1]
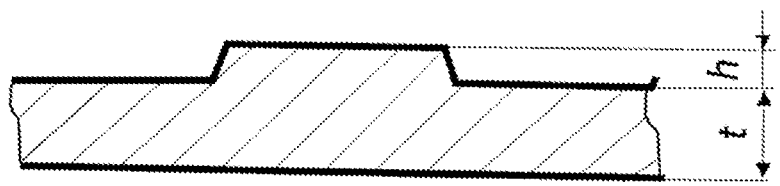
[Fig. 2]
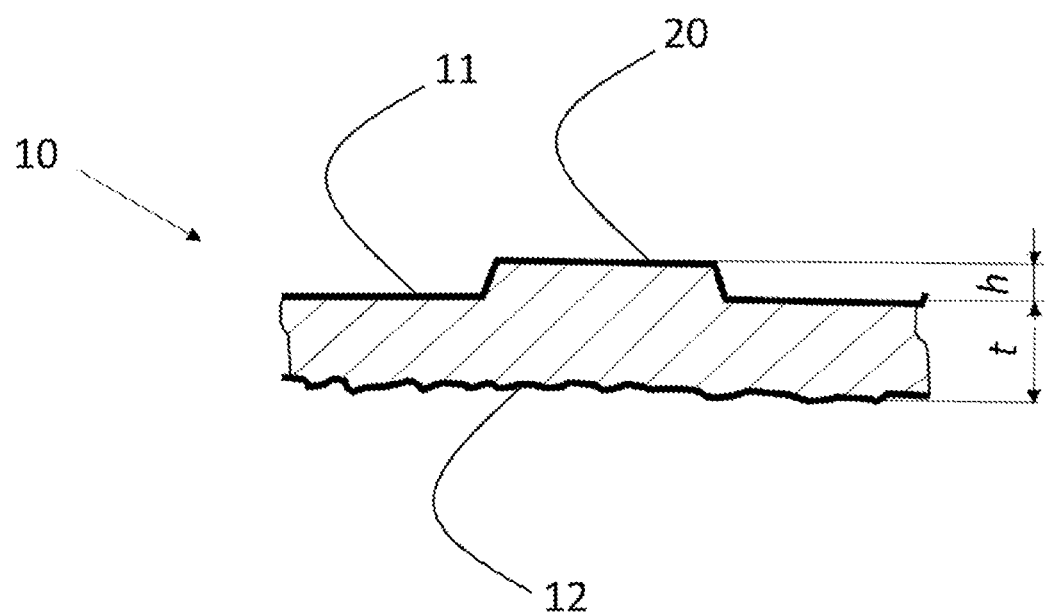

[Fig. 3]
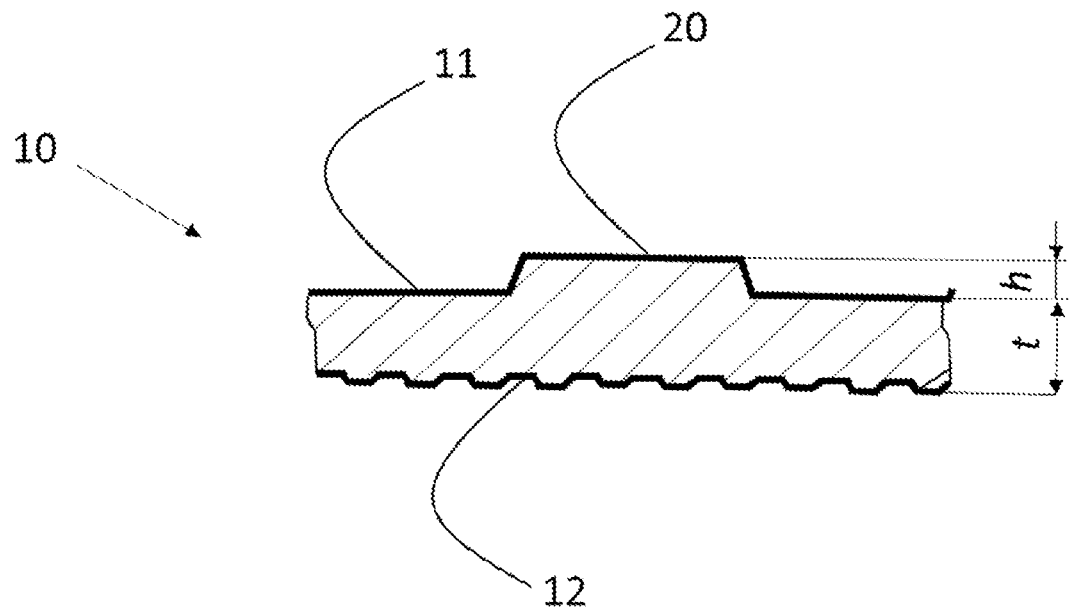
[Fig. 4]
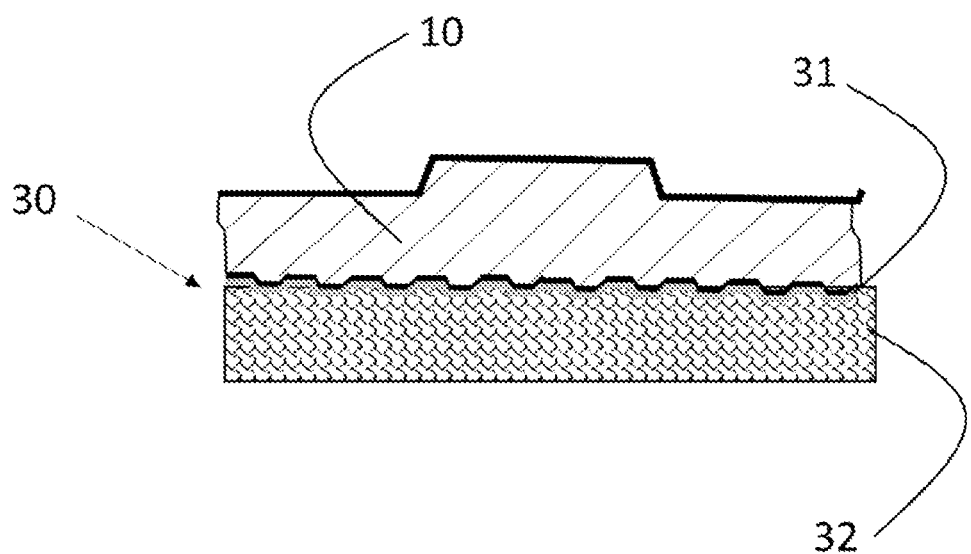

[Fig.5]
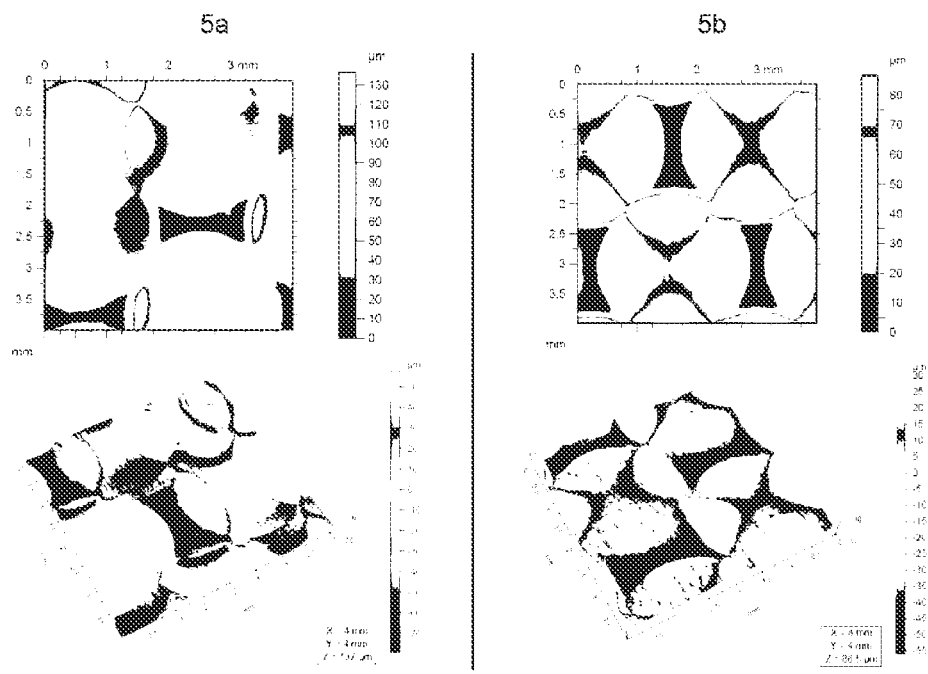

[Fig. 6]
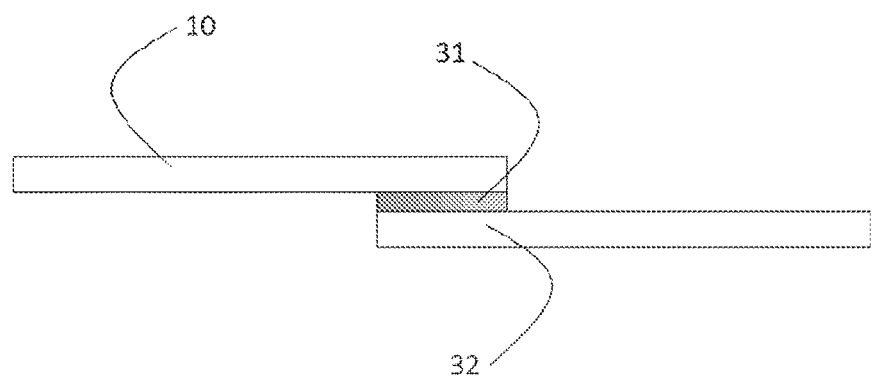

[Fig. 7]
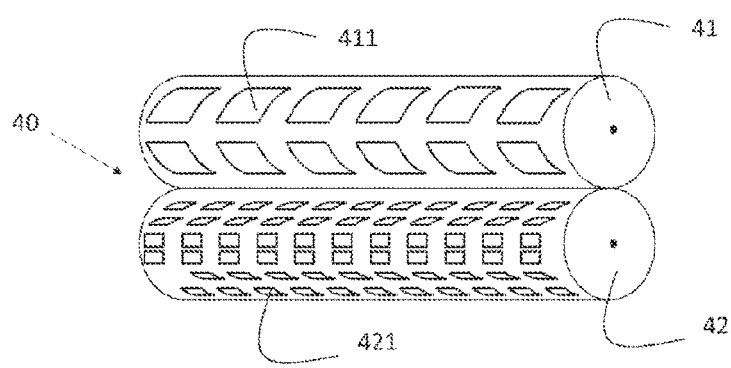

[Fig.8]
8a
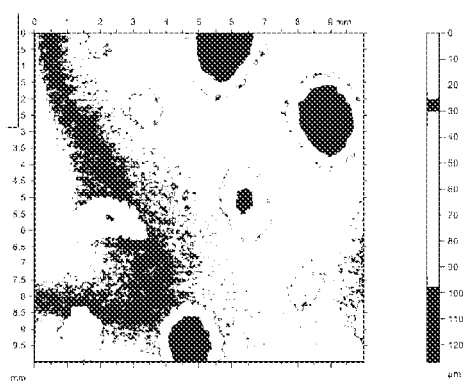
8b
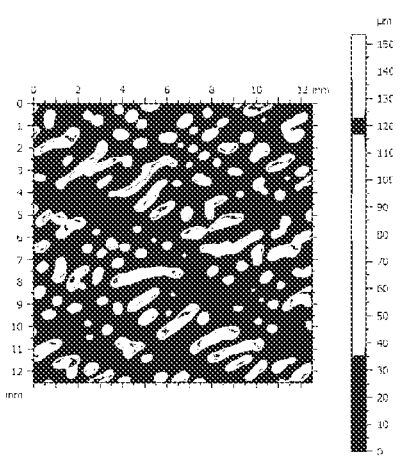
8c
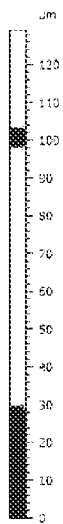

SHEET METAL PLATE WITH RAISED AREAS FOR CREATING INDUSTRIAL FLOORING WITH IMPROVED ADHESIVE PROPERTIES

CROSS-REFERENCE TO RELATED APPLICATIONS

This application is a National Stage entry of International Application No. PCT/FR2021/051712, filed Oct. 4, 2021, which claims priority to French Patent Application No. FR2010325, filed Oct. 9, 2020, the entire contents of each of which are incorporated herein by reference.

BACKGROUND

Technical Field

The invention relates to a sheet metal plate for making flooring, in particular of industrial vehicles, having on one of its faces a plurality of raised patterns arranged periodically, each pattern itself consisting of one or more protruding portion(s), which we will call "reliefs". This sheet metal plate is intended to be bonded to a support, typically boards, to form the flooring of the industrial vehicle.

DESCRIPTION OF RELATED ART

There are already many models of sheet metal plates on the market with repetitive raised patterns, or "tread plates". According to standard EN12258-1, the term "tread plate" refers to a sheet or plate "upon which a pattern has been impressed on one side, by rolling". For example, these patterns are described in the standard NF-EN-1386 and are often designated pictorially (checkerboard, barley grain, almond, diamond, rice grain, checkerboard 2, checkerboard 5, . . . ). The "checkerboard 5" pattern, also called "quintet", frequently used to make sheet metal plates of industrial flooring, has a group of 5 elongated bumps, half-ovoid in shape, parallel to each other, which is surrounded by four identical groups therebetween and deduced from the first group by a rotation by 90°. Sheet metal plates that have this "quintet" pattern are very resistant to wear but have average non-skid qualities. FIG. 1 represents a relief plate according to the standard EN1386. The height of the raised pattern is the difference, h, between the maximum thickness measured up to the top of the pattern and the thickness t of the relief-free adjoining area.

The "rice grain" pattern, described in the patent FR 2 747 948, is also used for making sheet metal plates made of an aluminum alloy for industrial flooring, which have satisfactory use properties, in particular because they have a good resistance to wear and offer rubbing contact conditions that enable pedestrians to walk without any risk of falling by slipping and trolleys to roll without skidding.

The patent application WO2011/121191 describes a sheet metal plate for making flooring, in particular of industrial vehicles, over which trolleys should circulate, having a plurality of patterns, the reliefs of which have a maximum height comprised between and 1.5 mm and a rubbing surface which, regardless of the direction according to which it is measured, has an average width at least equal to 1 mm.

The sheet metal plates with raised areas have on the upper face, intended to form the floor and to be in contact with people or handling vehicles used for example in the industrial vehicle, said repetitive raised patterns.

The patent application WO03/013752 describes a structure and associated methods having non-skid surfaces formed on the protrusions, recesses or other surfaces of the structure to promote safe and stable movement of people and/or objects over the structure. The patent application EP2316590 describes a crept sheet with a repetitive pattern with a plurality of pattern units. Each pattern unit comprises one or more raised elongated relief(s), one elongated relief having a length along a major axis and a width smaller than the length along a minor axis perpendicular to the major axis.

The U.S. Pat. No. 1,856,898 describes the manufacture of engraved sheet metal plates characterized by surfaces made rough by multiple projections or embossing.

The patent application JPS59202103 describes the manufacture by rolling of a strip or sheet having a partially grid pattern which is continuous in the rolling direction.

The patent application JPH03114601 describes rolling of a steel strip crept on only one side by measuring the thickness of the strip steel board under rolling by a radiation thickness gauge and while adjusting the draft of a rolling mill so that the difference of its average values falls within a desired range.

Most often, the lower face of the tread plate is bonded to a support, for example a wooden board typically made of plywood, to form the flooring of the industrial vehicle. To obtain enough adhesion between the lower face of the sheet metal plate and the support, according to the prior art, a surface treatment is carried out, typically degreasing and, the deposition of an adhesion primer layer such as typically a varnish. This treatment is effective, yet, it requires carrying out additional operations which result in a high cost.

The patent application JP2011069060A discloses a decorative sheet for a floor material, wherein a transparent resin layer composed of a polypropylene resin layer is superimposed on a base material sheet, wherein at least one transparent resin layer with a thickness of 150 µm or more is rolled over the base material sheet via an adhesive layer, is characterized as follows: (1) the transparent resin layer is composed of two or more polypropylene resin layer(s); and (2) the polypropylene resin layer, bonded to the base material sheet, amongst the two polypropylene resin layers or more, has a bending stiffness from 200 to 500 MPa.

The patent KR102147477B1 discloses a versatile panel with improved adhesion and durability comprising a plurality of inner layer panels bonded by a bonding resin and an outer layer panel respectively bonded to the upper and lower surfaces of the inner layer panel, wherein a plurality of air holes are formed to penetrate in the widthwise direction along the lengthwise direction.

The utility model CN201933751U relates to a metal floor slab with a thickness from 1.5 to 5.5 mm. The metal floor tile comprises a panel and a flange formed by bending downwards starting from the periphery of the panel, wherein a plurality of open holes are punched on the panel; one end of each open hole is directed downwards to form an anchor bar connected to the panel; a plurality of through holes are punched on the rim; and one end of each through hole is directed inwards to form a reinforcing bar connected to the rim.

The problem that the present invention is intended to solve is to obtain a tread plate metal plate having an improved adhesion without requiring a surface treatment operation and deposition of an adhesion primer layer.

SUMMARY

A first object of the invention is a sheet metal plate for making flooring, in particular of industrial vehicles, said sheet metal plate having on its upper face a plurality of raised patterns, each raised pattern comprising one or more protruding portion(s), said raised patterns being arranged periodically, discreetly and in orderly fashion, the height h of said raised patterns being comprised between 0.3 and 3 mm, characterized in that it has on its lower face, intended to be bonded to a support, a rough surface whose roughness $R_{max}$ is comprised between 10 µm and 250 µm.

A second object of the invention is a method for manufacturing sheet metal plates according to the invention which comprises
  (i) A rolling step using a rolling engraved roll including engraved cavities allowing obtaining the raised patterns of the upper face of the sheet metal plate.
  (ii) A step of electrochemical milling, mechanical milling, brushing, or deformation, typically sandblasting, shot-peening, rolling, embossing, creeping, allowing obtaining the roughness of the lower face of the sheet metal plate.

Another object of the invention is the use of a sheet metal plate according to the invention to make flooring of industrial vehicles, preferably flooring of refrigerated vehicles.

BRIEF DESCRIPTION OF THE DRAWINGS

FIG. 1 is a schematic sectional representation of a sheet metal plate with raised areas according to the prior art.
FIG. 2 is a schematic sectional representation of a sheet metal plate according to the invention.
FIG. 3 is a schematic sectional representation of a sheet metal plate according to the invention according to an advantageous embodiment.
FIG. 4 schematically illustrates bonding of a sheet metal plate according to the invention on a wooden flooring.
FIG. 5 shows the patterns of Examples B (FIG. 5a) and C (FIG. 5b).
FIG. 6 is a schematic representation of the lap shear test.
FIG. 7 is a schematic representation of a rolling mill used in the method according to the invention.
FIG. 8 shows the patterns of Examples E (FIG. 8a), F (FIG. 8b), and G (FIG. 8c).

DETAILED DESCRIPTION OF THE INVENTION

The sheet metal plate according to the invention is a sheet metal plate intended to be bonded to a support to form the flooring of a vehicle. According to the common definition, a sheet metal plate is a rolled product with a generally rectangular cross-section whose average thickness does not exceed ¹⁄₁₀th of the width. The flooring is the portion of a construction work or a vehicle which forms a horizontal platform, the upper face of which forms the ground. The roughness parameter $R_{max}$ is defined as the largest difference between the highest peak and the lowest trough over the analyzed length or the analyzed surface. Typically, the analyzed length has a direction perpendicular to the rolling direction of the sheet metal plate and has a value depending on the value $R_{max}$, as described hereinafter:

| | |
|---|---|
| 0.025 µm < $R_{max}$ ≤ 0.1 µm | typical analyzed length: 0.08 mm |
| 0.1 µm < $R_{max}$ ≤ 0.5 µm | typical analyzed length: 0.25 mm |
| 0.5 µm < $R_{max}$ ≤ 10 µm | typical analyzed length: 0.80 mm |
| 10 µm < $R_{max}$ ≤ 50 µm | typical analyzed length: 2.50 mm |
| 50 µm < $R_{max}$ ≤ 250 µm | typical analyzed length: 8.00 mm |

It might be more appropriate for some facets featuring discrete patterns to characterize by a surface large enough to include several patterns.

In particular, the parameter $R_{max}$ is mentioned in BS 1134 2010 A2 wherein the definitions hereinabove may be supplemented where necessary.

The sheet metal plate according to the invention has on its upper face, intended to form the upper face of the flooring, raised patterns which comprise one or more protruding portion(s) and which, like the elementary mesh of a crystal lattice, are repeated periodically and in orderly fashion. Hence, a raised pattern is a piece of sheet metal which is repeated indefinitely by translation in two directions of the plane of the sheet metal plate. This piece of sheet metal may comprise only one protruding portion but it may also comprise several protruding portions which may have different shapes or orientations. It does not seem advantageous to have protruding portions with different heights but this is not excluded a priori. The height h of these raised patterns is comprised between 0.3 mm and 3 mm. The height of the raised pattern is the difference, h, between the maximum thickness measured up to the top of the pattern and the thickness t of the relief-free adjoining area. Advantageously, in particular as regards sheet metal plates with raised areas made of an aluminum alloy, it is comprised between 0.3 and 1.5 mm, preferably between 0.4 and 0.8 mm.

Said patterns are also repeated discreetly, because such a configuration is favorable to the non-skid property of the flooring. Indeed, the reliefs behave like indenters which act on the surface of the sole or the tread of the wheel: under the effect of the weight of the pedestrian or the trolley, the latter deforms and "sinks" around the relief over a given height whose order of magnitude is one, two or three tenths of a millimeter. A discontinuous relief promotes, in the sole or the tread, the formation of a bead all around its top wall, which promotes "hooking" of the sole, the tread or the tire of the wheel on the floor. On the other hand, patterns that are discreetly repeated facilitate cleaning, the flow of fluids and the discharge thereof being easier. Hence, the sheet metal plate according to the invention should not have any continuous relief.

The raised patterns of the upper face are obtained by rolling using a rolling engraved roll characterized in that it includes engraved cavities allowing obtaining the raised patterns of the sheet metal plate.

According to the invention, the lower face of the sheet metal plate, intended to be bonded to a flooring, has a rough surface whose roughness $R_{max}$ is comprised between 10 µm and 250 µm and preferably between 50 µm and 150 µm, preferably between 100 µm and 140 µm.

The present inventor has noticed that thanks to the roughness of the lower face of the sheet metal plate, the adhesion between the flooring, typically made of wood, and the sheet metal plate is satisfactory in the absence of surface treatment and of primer deposition. In particular, the roughness according to the invention may be obtained by electrochemical milling, mechanical milling, brushing, or by deformation, typically sandblasting, shot-peening, rolling, embossing, creeping. Preferably, the roughness is obtained by rolling.

In an advantageous embodiment of the invention, the roughness of the lower face of the sheet metal plate is obtained by a texture, preferably made by rolling. In this embodiment, the sheet metal plate according to the invention has on its lower face a texture which comprises one or more protruding portion(s) and which are repeated periodically and in orderly fashion. It does not seem advantageous to have protruding portions with different heights but this is not excluded a priori. In this embodiment, the roughness $R_{max}$ of the lower face of the sheet metal plate corresponds to the maximum height of these protruding portions of the lower face. Preferably, in this preferred embodiment, at least 30% and preferably at least 50% of the lower face of the sheet metal plate is covered by the texture and/or the dimension of the texture is comprised between 1 and 6 mm and/or the replication pitch of the texture is comprised between 1 and 6 mm.

Advantageously, the sheet metal plate according to the invention is an aluminum alloy sheet metal plate. Advantageously, the sheet metal plate is made of an aluminum alloy belonging to the group including the aluminum alloys of the 1xxx, 3xxx, 5xxx, 6xxx series according to the designation of the Aluminum Association as well as the alloys of the 7xxx series, comprising less than 0.4% Cu. Preferably, the alloy is selected from the list consisting of AA1050A, AA3003, AA3103, AA5026, AA5052, AA5083, AA5086, AA5754, AA6061, AA6082 and AA7020.

FIG. 2 schematically represents a sheet metal plate 10 according to the invention having on its upper face 11 a raised pattern comprising a protruding portion 20, with a height h and on its lower face 12, a rough surface.

FIG. 3 schematically represents a sheet metal plate 10 according to the invention in a preferred embodiment having on its upper face 11 a raised pattern comprising a protruding portion 20, with a height h and on its lower face 12, a rough surface consisting of a texture including protruding portions repeated periodically and in orderly fashion.

FIG. 4 schematically represents a flooring 30 comprising a sheet metal plate 10 according to the invention bonded to a board 32 using an adhesive 31.

The method for manufacturing the sheet metal plates according to the invention comprises
  (i) A rolling step using a rolling engraved roll including engraved cavities allowing obtaining the raised patterns of the upper face of the sheet metal plate.
  (ii) A step of electrochemical milling, mechanical milling, brushing, or deformation, typically sandblasting, shot-peening, rolling, embossing, creeping, allowing obtaining the roughness of the lower face of the sheet metal plate.

Advantageously, the two steps are carried out simultaneously on a rolling mill including two engraved rolls: a first engraved roll to obtain the raised patterns of the upper face and a second engraved roll to obtain the texture of the lower face. In an advantageous embodiment, the two engraved rolls are the work rolls used during the last pass of a hot tandem rolling mill. A tandem rolling mill is a rolling mill comprising several successive stands, wherein the product is engaged in several stands at the same time.

FIG. 7 schematically represents the last stand 40 of a hot tandem rolling mill in this embodiment. The used working rolls 41, 42 are engraved rolls. A first engraved roll 41 includes cavities 411 allowing obtaining the raised patterns of the upper face. A second engraved cylinder 42 includes cavities 421 allowing obtaining the texture of the lower face of the sheet metal plate.

The use of the sheet metal plates according to the invention to make flooring of industrial vehicles, preferably flooring of refrigerated vehicles is particularly advantageous.

Example

In this example, the adhesion performance of a 2.5 mm thick sheet metal plate made of the AA5086 alloy, having on the upper face a relief with a rice grain pattern as defined in the standard NF EN 1386 and on the lower face a variable roughness, has been compared. In a reference example A, the lower face was unrolled and the roughness $R_{max}$ was smaller than 3 μm. In examples according to the invention B, C, E, F and G the lower face was textured with patterns having reliefs with different heights as described in Table 1. The textured patterns have been obtained by rolling with an engraved roll. The same roll has been used for the samples B and C with a different clamping force so as to make the depth of the indentation vary. These textures are shown in FIG. 5. The pitch of the patterns being about 4 mm in the X and Y direction. The patterns were circles with a diameter of about 2.5 mm. The patterns of Examples E, F and G are shown in FIGS. 8a, 8b and 8c, respectively. All samples have been degreased and then a lubricant (Lubrilam) has been deposited on the surface at 0.3 g/m 2 so as to simulate an unrolled sample under reproducible conditions. A fourth sample D has been prepared according to the prior art by depositing an adhesion primer varnish over the lower face.

The configuration of the test is shown in FIG. 6. Samples measuring 100×25 mm of a sheet metal plate 10 and plywood boards 32 have been bonded using an epoxy 31 (Korapür 666) type glue over a joint length of 16.5 mm and undergone a lap shear test. The obtained results are shown in Table 1. When the break-up occurs within the wood or within the glue, the break-up is said to be cohesive. When the break-up occurs at the interface between the sheet metal plate and the glue, the break-up is said to be adhesive. In the absence of a textured pattern, the break-up is essentially adhesive and a strong dispersal of the shear force is observed. On the contrary, in the presence of the textured pattern, the break-up is cohesive and the obtained force is similar to that obtained according to the prior art in the presence of an adhesion primer.

TABLE 1

| Sheet metal plate | Adhesion primer | $R_{max}$ (μm) | Break-up | Shear force (MPa) |
|---|---|---|---|---|
| A | No | <3 | Adhesive | 9.6 +/− 4.1 |
| B | No | 137 | Cohesive | 12.2 +/− 0.5 |
| C | No | 87 | Cohesive | 10.7 +/− 0.6 |
| D | Yes | <3 | Cohesive | 11.6 +/− 0.7 |
| E | No | 110 | Cohesive | 11.2 +/− 1.2 |
| F | No | 108 | Cohesive | 10.8 +/− 2.2 |
| G | No | 98 | Cohesive | 9.2 +/− 2.8 |

The invention claimed is:

1. A sheet metal plate for making flooring, said sheet metal plate having on an upper face thereof a plurality of raised patterns, each raised pattern comprising one or more protruding portion(s), said raised patterns being arranged periodically, discreetly and in orderly fashion, the height h of said raised patterns being comprised between 0.3 and 3 mm, wherein said sheet metal plate has on a lower face thereof, intended to be bonded to a support, a rough surface whose roughness $R_{max}$ is comprised between 10 μm and 250 μm.

2. The sheet metal plate according to claim 1, wherein the roughness $R_{max}$ of said rough surface is comprised between 50 μm and 150 μm.

3. The sheet metal plate according to claim 1, wherein the roughness of the lower face is obtained by electrochemical milling, mechanical milling, brushing, or by deformation.

4. The sheet metal plate according to claim 1, wherein the roughness of the lower face is obtained by a texture repeated periodically and in orderly fashion.

5. The sheet metal plate according to claim 1, wherein the sheet metal plate is made of an aluminum alloy belonging to the group including the aluminum alloys of the 1xxx, 3xxx, 5xxx, 6xxx series according to the designation of the Aluminum Association as well as the alloys of the 7xxx series, comprising less than 0.4% Cu.

6. The sheet metal plate according to claim 1 for making flooring of industrial vehicles.

7. The sheet metal plate according to claim 2, wherein the roughness $R_{max}$ of said rough surface is comprised between 100 μm and 140 μm.

8. The sheet metal plate according to claim 3, wherein the roughness of the lower face is obtained by sandblasting, shot-peening, rolling, embossing, and/or crimping.

9. The sheet metal plate according to claim 3, wherein the roughness of the lower face is obtained by rolling.

10. The sheet metal plate according to claim 4, wherein the roughness of the lower face is made by rolling.

11. The sheet metal plate according to claim 6 for making flooring of refrigerated vehicles.

12. A method of manufacturing a sheet metal plate according to claim 1, comprising:
(i) rolling using a rolling engraved roll including engraved cavities allowing obtaining the raised patterns of the upper face of the sheet metal plate;
(ii) electrochemical milling, mechanical milling, brushing, or deformation, allowing obtaining the roughness of the lower face of the sheet metal plate.

13. The method according to claim 12, wherein (i) and (ii) are carried out simultaneously on a rolling mill including two engraved rolls: a first engraved roll to obtain the raised patterns of the upper face and a second engraved roll to obtain the texture of the lower face of the sheet metal plate.

14. The method according to claim 13, wherein the two engraved rolls are work rolls used during a last pass of a hot tandem rolling mill.

15. The method according to claim 12, wherein (ii) is carried out by sandblasting, shot-peening, rolling, embossing, and/or creeping.

* * * * *